United States Patent
Shugurov et al.

(10) Patent No.: US 11,915,451 B2
(45) Date of Patent: Feb. 27, 2024

(54) DENSE 6-DOF POSE OBJECT DETECTOR

(71) Applicant: SIEMENS AKTIENGESELLSCHAFT, Munich (DE)

(72) Inventors: Ivan Shugurov, Munich (DE); Andreas Hutter, Munich (DE); Sergey Zakharov, San Francisco, CA (US); Slobodan Ilic, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 285 days.

(21) Appl. No.: 17/427,231

(22) PCT Filed: Jan. 17, 2020

(86) PCT No.: PCT/EP2020/051136
§ 371 (c)(1),
(2) Date: Jul. 30, 2021

(87) PCT Pub. No.: WO2020/156836
PCT Pub. Date: Aug. 6, 2020

(65) Prior Publication Data
US 2022/0101639 A1     Mar. 31, 2022

(30) Foreign Application Priority Data
Feb. 1, 2019 (EP) .................................... 19155034

(51) Int. Cl.
*G06T 7/73*     (2017.01)
*G06N 3/08*     (2023.01)
(Continued)

(52) U.S. Cl.
CPC ................. *G06T 7/75* (2017.01); *G06N 3/08* (2013.01); *G06T 7/90* (2017.01); *G06T 17/10* (2013.01);
(Continued)

(58) Field of Classification Search
CPC .. G06T 17/10; G06T 7/75; G06T 7/90; G06T 2207/20081; G06T 2207/20084;
(Continued)

(56) References Cited

U.S. PATENT DOCUMENTS

2018/0137644 A1    5/2018   Rad et al.
2019/0026917 A1*   1/2019   Liao ..................... G06V 10/82
(Continued)

OTHER PUBLICATIONS

Xiang et al (A Convolutional Neural Network for 6D Object Pose Estimation in Cluttered Scenes; Submitted on Nov. 1, 2017 (v1), last revised May 26, 2018 "https://arxiv.org/abs/1711.00199").*

(Continued)

*Primary Examiner* — Xilin Guo
(74) *Attorney, Agent, or Firm* — Lempia Summerfield Katz LLC

(57) ABSTRACT

A method and a system for object detection and pose estimation within an input image. A 6-degree-of-freedom object detection and pose estimation is performed using a trained encoder-decoder convolutional artificial neural network including an encoder head, an ID mask decoder head, a first correspondence color channel decoder head and a second correspondence color channel decoder head. The ID mask decoder head creates an ID mask for identifying objects, and the color channel decoder heads are used to create a 2D-to-3D-correspondence map. For at least one object identified by the ID mask, a pose estimation based on the generated 2D-to-3D-correspondence map and on a pre-generated bijective association of points of the object with unique value combinations in the first and the second correspondence color channels is generated.

14 Claims, 3 Drawing Sheets

(51) Int. Cl.
*G06T 7/90* (2017.01)
*G06T 17/10* (2006.01)
*G06V 10/82* (2022.01)
*G06V 20/00* (2022.01)
*G06V 20/64* (2022.01)

(52) U.S. Cl.
CPC .............. *G06V 10/82* (2022.01); *G06V 20/00* (2022.01); *G06V 20/647* (2022.01)

(58) Field of Classification Search
CPC .......... G06T 2207/10024; G06V 20/00; G06V 10/82; G06V 20/647; G06N 3/08
See application file for complete search history.

(56) References Cited

U.S. PATENT DOCUMENTS

| | | | | |
|---|---|---|---|---|
| 2019/0147221 | A1* | 5/2019 | Grabner | G06T 7/75 382/103 |
| 2019/0217476 | A1* | 7/2019 | Jiang | B25J 11/008 |

OTHER PUBLICATIONS

European Search Report for European Application No. 19155034.2-1207 dated Jul. 26, 2019.

Feng, Yao, et al. "Joint 3d face reconstruction and dense alignment with position map regression network." Proceedings of the European Conference on Computer Vision (ECCV). 2018. pp. 557-574.

Güler, Riza Alp, Natalia Neverova, and Iasonas Kokkinos. "Densepose: Dense human pose estimation in the wild." Proceedings of the IEEE conference on computer vision and pattern recognition. 2018. pp. 7297-7306.

He, Kaiming, et al. "Deep residual learning for image recognition." Proceedings of the IEEE conference on computer vision and pattern recognition. 2016. pp. 770-778.

Kehl, Wadim, et al. "Ssd-6d: Making rgb-based 3d detection and 6d pose estimation great again." Proceedings of the IEEE international conference on computer vision. 2017. pp. 1521-1529.

PCT International Search Report and Written Opinion of International Searching Authority dated Jun. 24, 2020 corresponding to PCT International Application No. PCT/EP2020/051136.

Tekin, Bugra, Sudipta N. Sinha, and Pascal Fua. "Real-time seamless single shot 6d object pose prediction." Proceedings of the IEEE Conference on Computer Vision and Pattern Recognition. 2018. pp. 292-301.

Yinlin Hu et al: "Segmentation-driven 6D Object Pose Estimation"; arxiv.org, Cornell University Library; 201 Olin Library Cornell University Ithaca, NY; 14853; Dec. 6, 2018. pp. 1-10.

Zakharov, Sergey, Ivan Shugurov, and Slobodan Ilic. "Dpod: 6d pose object detector and refiner." Proceedings of the IEEE/CVF International Conference on Computer Vision. 2019. pp. 1941-1950.

Zhang, Zhengyou. "A flexible new technique for camera calibration." IEEE Transactions on pattern analysis and machine intelligence 22.11 (2000): 1330-1334.

* cited by examiner

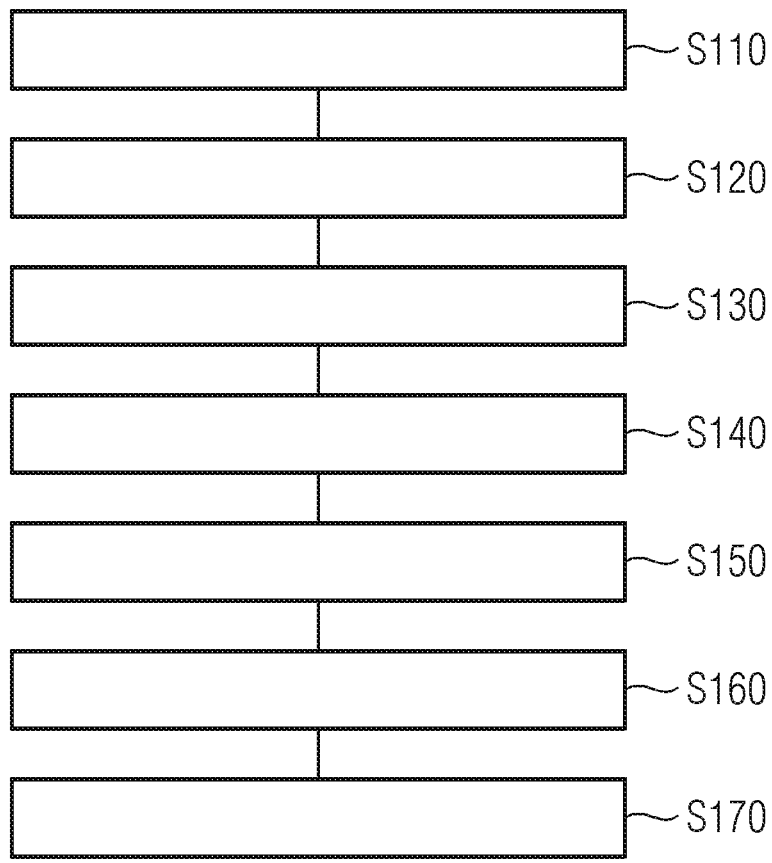
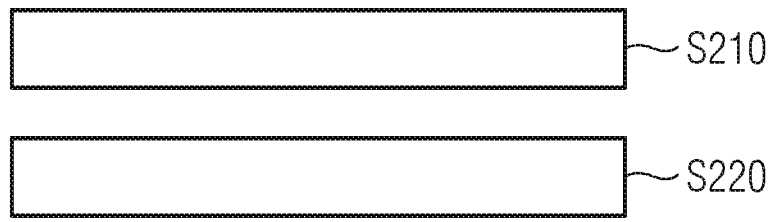

DENSE 6-DOF POSE OBJECT DETECTOR

CROSS REFERENCE TO RELATED APPLICATIONS

This present patent document is a § 371 nationalization of PCT Application Serial Number PCT/EP2020/051136 filed on Jan. 17, 2020, designating the United States, which is hereby incorporated in its entirety by reference. This patent document also claims the benefit of EP19155034.2 filed on Feb. 1, 2019 which is hereby incorporated in its entirety by reference.

FIELD

Embodiments relate to a computer-implemented method for object detection and pose estimation within an input image.

Pose estimation is, for example a 6-degree-of-freedom, 6-DoF pose estimation, where 6 degrees of freedom relates to the six degrees of freedom of movement a three-dimensional body has: three linear directions of motion along axes of an orthogonal coordinate system as well as three rotary motions, often designated as rolling, pitching and yawing.

Object detection has always been an important problem in computer vision and a large body of research has been dedicated to it in the past. With the advent of deep learning, new techniques became feasible.

Typically, object detectors localize objects of interest in images in terms of tight bounding boxes around them. However, in many applications, e.g., augmented reality, robotics, machine vision etc., this is not enough and a full 6DoF pose (sometimes also called 6D pose) is required.

While this problem is comparatively simple to solve in depth images, the challenges are shifted to procuring depth images of sufficient quality with comparatively little effort. Depth images are created using depth cameras. However, reliable depth cameras are usually expensive and power-hungry. On the other hand, available low-quality depth sensors are prone to many artifacts resulting from the technology itself as well as from the design of the sensors. Moreover, depth cameras are usually quite imprecise, have a limited view range, and are not applicable in outdoor environments.

Apart from depth images, more conventional RGB images may in principle be used for object detection and pose estimation. The RGB color model is an additive color model in which Red, Green and Blue are added together in various ways to reproduce a broad array of colors.

In contrast to the problems with depth images, RGB images of high quality are much easier to obtain, due both to the comparatively higher quality of RGB sensors (cameras) at comparatively low cost as well as to the comparatively low power consumption by RGB sensor. However, in RGB images detecting a full 6DoF pose is a challenge due to perspective ambiguities and significant appearance changes of the object when seen from different viewpoints.

Recent deep learning-based approaches based on RGB images include works like: "W. Kehl, F. Manhardt, F. Tombari, S. Ilic, and N. Navab. SSD-6D: Making RGB-based 3D detection and 6D pose estimation great again. In Proceedings of the International Conference on Computer Vision (ICCV 2017), Venice, Italy, pages 22-29", hereafter referred to as "SSD6D" for "Single Shot Multibox Detector 6D", or: "B. Tekin, S. N. Sinha, and P. Fua. Real-Time Seamless Single Shot 6D Object Pose Prediction. Available at arXiv:1711.08848v5", hereafter referred to as "YOLO6D" for "You Only Look Once 6D". The pose estimation in the documents is, however, when no additional information is provided, relatively imprecise.

In the field of detecting people and their poses in images, works like "R. A. Güler, N. Neverova, and I. Kokkinos. DensePose: Dense human pose estimation in the wild. Available at arXiv:1802.00434v1", hereafter referred to as "DensePose", are available. The "DensePose" method estimates dense correspondences between vertices of a human body model and humans in the image. However, the "DensePose" method requires a sophisticated annotation tool and enormous annotation efforts, that makes the method expensive to employ.

US 2018/137644 A1 describes methods and systems of performing object pose estimations, in which an image including an object is obtained and a plurality of two-dimensional projections of three-dimensional bounding boxes of the object in the image are determined. The three-dimensional pose of the object is then estimated using the two-dimensional projections of the three-dimensional bounding boxes.

The scientific publication Feng Y., Wu F., Shao X., Wang Y., Zhou X. (2018), "Joint 3D Face Reconstruction and Dense Alignment with Position Map Regression Network", in: Ferrari V., Hebert M., Sminchisescu C., Weiss Y. (eds) Computer Vision—ECCV 2018, ECCV 2018, Lecture Notes in Computer Science, vol 11218, Springer, Cham, describes 3D face reconstruction based on 2D images of faces by using a UV position map that is a 2D image recording 3D positions of all points in a so-called UV space. A weight matrix is applied that weights certain features of the face higher than others when it comes to pose estimation.

BRIEF SUMMARY AND DESCRIPTION

The scope of the embodiments is defined solely by the appended claims and is not affected to any degree by the statements within this summary. The present embodiments may obviate one or more of the drawbacks or limitations in the related art.

Embodiments provide a method and a system for accurate object and pose determination with increased accuracy.

In an embodiment, a computer-implemented method for object detection and pose estimation within an input image is provided, the method including the steps of: receiving an input image; inputting the received input image into an artificial intelligence entity, for example a trained encoder-decoder (for example: convolutional) artificial neural network, including an encoder head, an ID mask decoder head, a first correspondence color channel decoder head, and a second correspondence color channel decoder head; generating, using the ID mask decoder head, from the received input image an ID mask identifying objects and a background in the received input image; generating, using the first correspondence color channel decoder head, from the received input image a first correspondence color channel of a (robust dense) 2D-to-3D-correspondence map for objects within the received input image; generating, using (or: based on) the second correspondence color channel decoder head, from the received input image a second correspondence color channel of the 2D-to-3D-correspondence map; generating the 2D-to-3D-correspondence map using the generated first correspondence color channel and the generated second correspondence color channel; and determining (e.g., using a pose determining module) for at least one object identified by the ID mask, a pose estimation (for example a 6-DoF pose estimation) based on the generated 2D-to-3D-correspondence map and on a pre-generated correspondence model of the object. The pre-generated correspondence model bijectivity associates points of the object with unique value combinations in the first and the second correspondence color channels.

Specifically, the first correspondence color channel may be a first color channel of an RGB color scheme, and/or the second correspondence color channel may be a second color channel of the RGB color scheme different from the first color channel.

The correspondence color channels do not indicate color values of the pixels of the input image in the respective colors; the correspondence color channels denote, by different levels of intensity of color, spatial correspondences between different points on objects according to the pre-generated bijective association of the points with the unique value combinations in the correspondence color channels. For example, a pixel that is completely red in the RGB input image may still have a 100% level of Blue in the 2D-to-3D-correspondence map that indicates spatial proximity to e.g., points including a 99% level of Blue or the like.

Formulating color regression problems as discrete color classification problems results in much faster convergence and superior quality of the 2D-3D-matching.

The approach described herein does not rely on regressing bounding boxes and using regions-of-interest (ROI) layers but instead uses ID masks to provide a deeper understanding of the objects in the input image. The present method outperforms existing RGB object detection and 6DoF pose estimation methods (also designated as "pipelines").

The 2D-to-3D-correspondence map may for example be a dense correspondence map as described e.g., in "Dense-Pose" described above in the sense that the correspondence map for each object covers with a predefined minimum resolution all points (surface points and/or wire model vertices).

Other attempts only compute a limited number of 2D-3D correspondences, e.g., nine for YOLO6D. Therefore, the approaches may be referred to as "coarse". In contrast, in the present case, much more than nine correspondences are obtained, therefore the term "dense". As a result, with the present method a final object pose may be computed more robustly: if some correspondences are missing, there are still other ones.

The input image may for example be an RGB image, e.g., represented by an H×W×3-dimensional tensor, with H marking the height of the input image in pixels, W the width of the input image in pixels (such that H×W is the total number of pixels of the input image), and 3 stemming from the three-color channels Red, Green, and Blue.

The ID mask may identify each of a plurality of objects within the input image.

The ID mask may be represented by an H×W×$N_{o+1}$ dimensional tensor, wherein $N_{o+1}$ is the number of (known and trained) identifiable objects plus 1 for the background, such that for each pixel a feature (or: class) is available that designates with which probability that pixel belongs to each of the identifiable objects or to the background.

For example, when only three objects are known and trained ($N_{O+1}$=4), then a specific pixel at height position 100 and at width position 120 may e.g., have 0.15 probability of belonging to a first object, 0.35 probability of belonging to a second object, 0.4 probability of belonging to a third object, and 0.1 probability of belonging to the background. The vector at the entry of H=100 and W=120 may then e.g., read [0.15, 0.35, 0.4, 0.1]. In some embodiments it may then be finally decided, when detecting the objects in the input image, that each pixel belongs to the class (i.e., object or background) with the highest probability. In the present example, it would then be decided that the pixel at H=100 and W=120 belong to the third object (probability of 40%).

The first and the second correspondence color channels U, V are provided each with a number $N_U$, $N_V$ of possible classes or features, each indicating the probability for that pixel of belonging to a certain color value in the respective correspondence color channel of the 2D-to-3D-correspondence map. The 2D-to-3D-correspondence map may then be represented by a H×W×$N_U$×$N_V$-dimensional tensor. Each pixel of the input image (denoted by H and W) is provided with $N_U$×$N_V$ features, each indicating with which probability that pixel belongs to a specific color combination (combination of levels of intensity of the two colors).

For example, the 2D-to-3D-correspondence map may be configured such that it distinguishes between 256 different values (levels of intensity of blue color) for the first correspondence color channel and between 256 different values (levels of intensity of green color) for the second correspondence color channel. The 2D-to-3D-correspondence map thus will include 256×256=65536 uniquely determined pixels, each including its own combination shade of blue and/or green color.

In some embodiments it may then be finally decided that each pixel has, for each correspondence color channel, the value with the highest probability. For example, the above-mentioned pixel at H=100 and W=120 may have the highest probability (e.g., of 0.12 or 12%) of having level of intensity 245 out of 255 in the first correspondence color channel, and the highest probability (e.g., of 0.16 or 16% of having level of intensity 136 out of 255 in the second correspondence color channel. It may then be finally decided that that pixel at H=100 and W=120 has the value combination 245 (first correspondence color channel)/136 (second correspondence color channel).

The correspondence maps bijectivity associate points of the objects with unique value combinations in the first and second correspondence color channels, i.e., each combination shade of colors corresponds uniquely to a point of the object and vice versa. Consequently, it is decided that the pixel at H=100 and W=120 corresponds to the point on the third object that is associated with that color combination shade 245/136.

In certain embodiments, the first correspondence color channel is a blue color channel and/or the second correspondence color channel is a green color channel. This color combination is easy to discern by artificial intelligence entities.

In certain embodiments, the determining of the at least one pose estimations uses a Perspective-n-Point, PnP, algorithm. The PnP algorithm may be provided as described e.g., in "Z. Zhang. A flexible new technique for camera calibration. IEEE Transactions on Pattern Analysis and Machine Intelligence 22(11):1330-1334. December 2000".

In certain embodiments, the PnP algorithm is used with a Random Sample Consensus, RANSAC, algorithm.

In certain embodiments, the determining of the at least one pose estimation uses a trained artificial neural network entity configured and trained to generate, from the ID mask and the 2D-to-3D-correspondence map, probabilities for each of a plurality of 3D poses of the at least one object, and for example for all objects identified by the ID mask. Thereafter, that pose may be determined to be correct by the pose determining module for which the highest probability has been determined.

In certain embodiments, the method further includes a step of generating the bijective association for at least one object, the bijective association being generated by texturing a 3D representation of the object using a 2D correspondence texture including of a plurality of pixels, each pixel including a unique value combination in the first and the second correspondence color channels. Each point of the model, e.g., a vertex of a wire model or a CAD model, is then associated with the unique value combination (or: color shade combination) with which it has been textured.

In certain embodiments, texturing the 3D representation of the object is performed using a spherical projection. Spherical projections use a full sphere to texture an object from all sides.

Embodiments provide a computer program including executable program code configured to, when executed (e.g., by a computing device), perform the method according to one or more described embodiments.

Embodiments provide a non-transitory computer-readable data storage medium including executable program code configured to, when executed (e.g., by a computing device), perform the method according to one or more described embodiments.

Embodiments provide a data stream including (or configured to generate) executable program code configured to, when executed (e.g., by a computing device), perform the method according to one or more described embodiments.

Embodiments provide a system for object detection and pose estimation within an input image. The system includes: an input interface for receiving an input image; a computing device configured to implement a trained encoder-decoder (for example: convolutional) artificial neural network including an encoder head, an ID mask decoder head, a first correspondence color channel decoder head and a second correspondence color channel decoder head. The ID mask decoder head is configured and trained to generate an ID mask identifying objects and background in the received input image. The first correspondence color channel decoder head is configured and trained to generate a first correspondence color channel of a dense 2D-to-3D-correspondence map for objects within the received input image. The second correspondence color channel decoder head is configured and trained to generate a second correspondence color channel of the dense 2D-to-3D-correspondence map. The computing device is further configured to implement a combining module and a pose determining module. The combining module is configured to generate the dense 2D-to-3D-correspondence map using the generated first correspondence color channel and the generated second correspondence color channel. The pose determining module is configured to determine, for at least one object identified by the ID mask (and for example for all objects identified by the ID mask), a pose estimation (for example a 6DoF pose estimation) based on the generated 2D-to-3D-correspondence map and on a pre-generated bijective association of points of the object with unique value combinations in the first and the second correspondence color channels.

The computing device may be realised as any device for computing, for example for executing a software, an app, or an algorithm. For example, the computing device may include a central processing unit (CPU) and a memory operatively connected to the CPU. The computing device may also include an array of CPUs, an array of graphical processing units (GPUs), at least one application-specific integrated circuit (ASIC), at least one field-programmable gate array, or any combination of the foregoing.

Some, or even all, modules of the system may be implemented by a cloud computing platform.

Embodiments provide a method for providing training data for training an encoder-decoder (for example: convolutional) artificial neural network for use in the method according to an embodiment of the first aspect is provided, the method including: providing, for each of a plurality of objects, a respective RGB image 2D patch corresponding to each of a plurality of poses of that object; providing, for each of the plurality of objects and for each of the plurality of poses, a corresponding ground truth ID mask patch; providing, for each of the plurality of objects and for each of the plurality of poses, a corresponding ground truth 2D-to-3D-correspondence map patch; providing a plurality of background images; arranging at least one of the provided RGB image 2D patches onto at least one of the plurality of background images in order to generate a sample input image, correspondingly arranging the corresponding ground truth 2D-to-3D-correspondence map patches onto a black background to provide a ground truth for the 2D-to-3D-correspondence map for the generated sample input image, and correspondingly arranging the corresponding ground truth ID mask patches onto the black background to provide a ground truth for the ID mask for the generated sample input image.

This method provides a large number of training data for training the encoder-decoder convolutional artificial neural network to a desired degree of accuracy.

In certain embodiments of the method according to the third aspect, a 3D representation (or: 3D model) for at least one object is provided, for example a CAD model. The 3D representation may be rendered in each of the plurality of poses on the black background, or, expressed in other words, may be rendered from each of a plurality of virtual camera viewpoints. This approach makes it possible to use known tools and software for rendering 3D representations of objects from different viewpoints, e.g., using graphical engines running on arrays of graphical processing units (GPUs).

It is equivalent whether one chooses to define the (virtual) camera view angle as fixed (as it might be during the inference stage, with the actual camera producing input images being fixed e.g., to a wall) while the objects are able to take different poses, or whether one chooses to define the object as fixed while the (virtual) camera is able to take different viewpoints. In the inference stage, of course, both the object(s) and a camera producing the input images may be able to move with respect to each other.

Each of the images resulting from the rendering may be cropped, for example so as to cut off all pixels not including a single object. Based on each of the cropped resulting images (or, if no cropping is performed, on the uncropped resulting images) a corresponding RGB image 2D patch and a corresponding ground truth ID mask patch are generated. The corresponding RGB image 2D patch depicts the actual appearance of the object in the corresponding pose, i.e., from the corresponding viewpoint. The corresponding ground truth ID mask patch separates the RGB image 2D patch from the black background, i.e., it identifies the pixels within the RGB image 2D patch shape as belonging to a specific class (either one of the known object classes or the background class).

In certain embodiments, when rendering the 3D representation, a corresponding depth channel is used to generate a depth map for the corresponding object in the corresponding pose. The depth map may then be used to generate a bounding box used to crop each resulting image, respectively. Pixels corresponding to depths of points of the object may include finite depth values below a certain threshold, whereas pixels corresponding to the background may include infinite depth values or at least depth values larger than the certain threshold. Cropping may then be performed by cutting off all pixels with depth values larger than the certain threshold.

Embodiments provide a system for providing training data including an input interface for receiving the plurality of background images (and, for example, for receiving additional data such as 3D representations of the objects, or data based on which such 3D representations of the objects may be generated), a computing device configured to perform the method according to described embodiments, and an output interface for outputting the sample input images together with its ground truth ID mask and its ground truth 2D-to-3D-correspondence map as a training data set.

For example, the computing device may be realized as an online data generator running on multiple CPU threads constantly putting prepared batches in a queue, from which they are picked as inputs to an encoder-decoder architecture being trained. In other words, the computing device may be configured to continuously provide training data to an encoder-decoder architecture being trained.

Embodiments provide a computer program including executable program code configured to, when executed (e.g., by a computing device), perform the method according to described embodiments.

Embodiments provide a non-transitory computer-readable data storage medium including executable program code configured to, when executed (e.g., by a computing device), perform the method according to described embodiments.

Embodiments provide a data stream including (or configured to generate) executable program code configured to, when executed (e.g., by a computing device), perform the method according to described embodiments.

Embodiments provide a method for training an encoder-decoder (for example: convolutional) artificial neural network. The method includes: providing (for example using a method according to an embodiment of the third aspect) a plurality of tuples of corresponding sample input images, ground truth ID masks and ground truth 2D-to-3D-correspondence maps; and training an encoder-decoder (for example: convolutional) artificial neural network configured to receive the sample input images as input and to output both an ID mask and a 2D-to-3D-correspondence map as output, the training being performed using a loss function penalizing deviations of the output from the ground truth ID mask and the ground truth 2D-to-3D-correspondence map.

In certain embodiments, the plurality of tuples is provided continuously during training. In other words, the tuples may be generated dynamically, or on-line, during the performing of the training method. This saves the need for generating and storing enormous quantities of data before performing the training.

The plurality of tuples may be provided continuously during training e.g., by the method according to the third aspect being performed by an online data generator running on multiple CPU threads constantly putting prepared batches in a queue, from which they are picked as inputs to an encoder-decoder architecture being trained.

According to an embodiment, a system for training an encoder-decoder convolutional artificial neural network is provided, the system including: an input interface configured to receive a plurality of tuples (for example provided using a method according to an embodiment of the third aspect) of corresponding sample input images, ground truth ID masks and ground truth 2D-to-3D-correspondence maps; and a computing device configured to train an encoder-decoder convolutional artificial neural network configured to receive the sample input images as input and to output both an ID mask and a 2D-to-3D-correspondence map as output, the training being performed using a loss function penalizing deviations of the output from the ground truth ID mask and the ground truth 2D-to-3D-correspondence map.

Embodiments also provide a computer program including executable program code configured to, when executed (e.g., by a computing device), perform the method according to described embodiments.

Embodiments also provide a non-transitory computer-readable data storage medium including executable program code configured to, when executed (e.g., by a computing device), perform the method according to described embodiments.

Embodiments also provide a data stream including (or configured to generate) executable program code configured to, when executed (e.g., by a computing device), perform the method according to described embodiments.

BRIEF DESCRIPTION OF THE FIGURES

FIG. 2 schematically illustrates a method according to an embodiment.

FIG. 3 schematically illustrates a method according to an embodiment.

DETAILED DESCRIPTION

Figure 1:
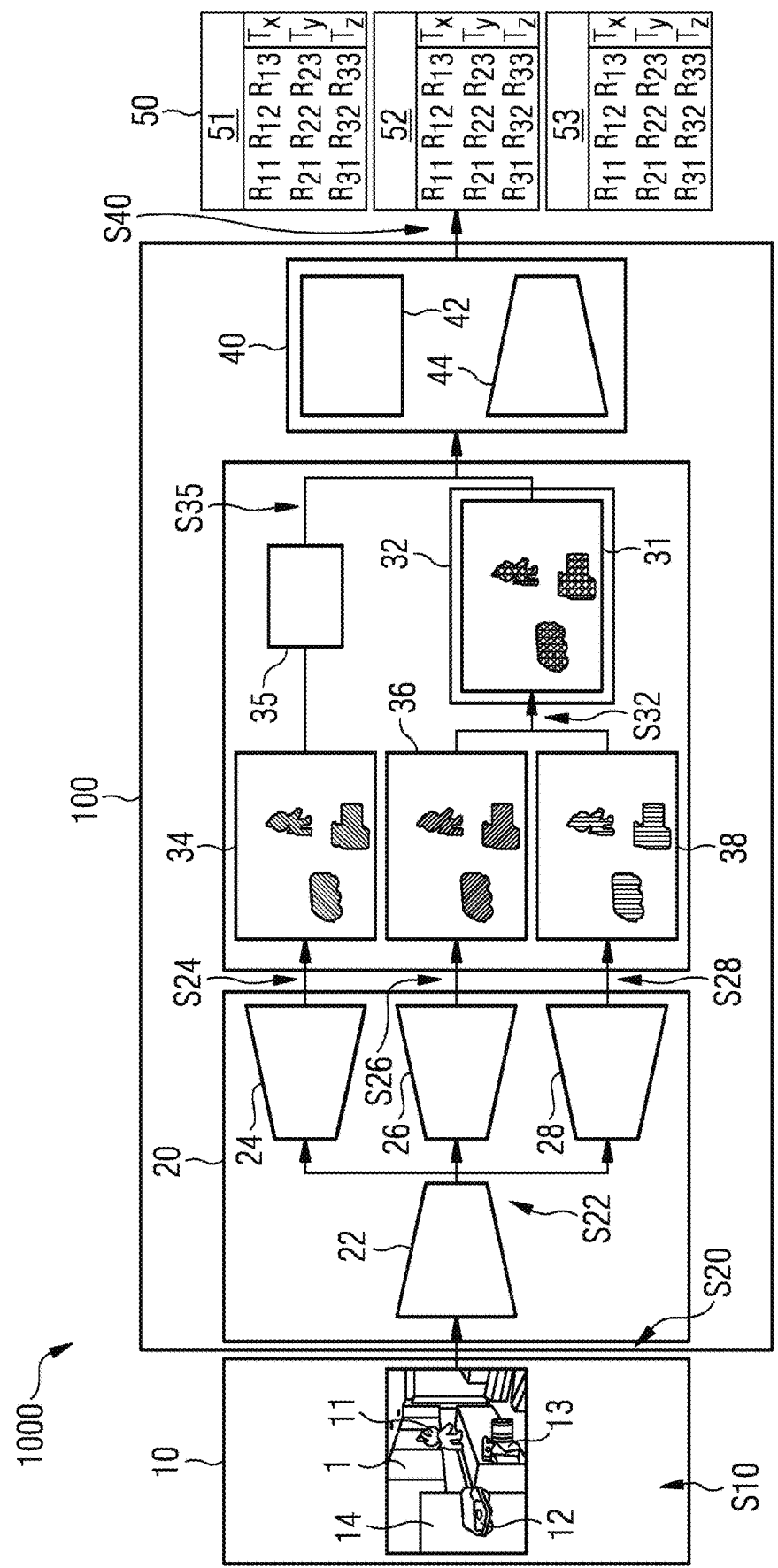
FIG. 1 schematically depicts a block diagram illustrating a system according to an embodiment.

FIG. 1 schematically illustrates a computer-implemented method for object detection and pose estimation within an input image according to an embodiment, as well as a system 1000 for object detection and pose estimation within an input image according to an embodiment. All advantageous options, variants and modifications described herein and in the foregoing with respect to embodiments of the method may be equally applied to, or provided in, embodiments of the system, and vice versa.

In the following, the method will be explained with reference to FIG. 1 and for example in connection with features of the system 1000. It should be understood that the method is, however, not restricted to being performed with the system 1000 and vice versa.

The system 1000 includes an input interface 10, a computing device 100, and an output interface 50.

In a first step S10 of the method, an input image 1 is received, for example by the input interface 10 of the system 1000. The input interface 10 may include a local interface connected to e.g., a bus system of a factory or a hospital and/or an interface for remote connections such as an interface for connecting to a wireless LAN or WAN connection, for example to a cloud computing system and/or the Internet.

The input image 1 is for example an RGB image, e.g., the input image 1 is for example represented by an H×W×3-dimensional tensor, with H marking the height of the input image 1 in pixels, W the width of the input image 1 in pixels (such that H×W is the total number of pixels of the input image), and 3 stemming from the three RGB color channels Red, Green, and Blue (RGB).

The input image for example includes one or more objects 11 that the method or the system is intended to detect (or: identify) and for which 6-DoF pose information is required.

In a step S20, the received input image 1 is input into a trained artificial intelligence entity, for example a trained encoder-decoder convolutional artificial neural network 20. The trained encoder-decoder convolutional artificial neural network 20 is implemented as including an encoder head 22, an ID mask decoder head 24, a first correspondence color channel decoder head 26 and a second correspondence color channel decoder head 28. Additional color decoder heads, associated with additional colors may be provided for additional reliability and/or redundancy. For example, a third color decoder head may be provided.

The trained encoder-decoder convolutional artificial neural network 20 is configured and trained for detection and pose determination of specific, previously known objects. For example, in a factory environment, such objects may include robots, workpieces, vehicles, movable equipment, source materials and/or the like. As an example for objects, in FIG. 1 the input image 1 is shown as including a teddy bear 11, an egg carton 12, and a camera 13, before a background 14.

The encoder head 22 may, for example, be realized by a 12-layer ResNet-like architecture featuring residual layers that allow for faster convergence. The ResNet architecture is described, for example, in "K. He, X. Zhang, S. Ren, and J. Sun. Deep Residual Learning for Image Recognition. In 2016 IEEE Conference on Computer Vision and Pattern Recognition (CVPR), pages 770-778. IEEE."

However, the proposed method is agnostic to a particular choice of encoder-decoder architecture of which a large variety is known. Any other backbone architectures may be used as well without any need to change the conceptual principles of the method.

In the system 1000, the trained encoder-decoder convolutional artificial neural network 20 may be implemented by the computing device 100.

The computing device 100 may be realised as any device for computing, for example for executing a software, an app, or an algorithm. For example, the computing device may include a central processing unit (CPU) and a memory operatively connected to the CPU. The computing device 100 may also include an array of CPUs, an array of graphical processing units (GPUs), at least one application-specific integrated circuit (ASIC), at least one field-programmable gate array, or any combination of the foregoing. Some, or even all, modules (for example decoder and/or encoder heads) of the system 1000 may be implemented by a cloud computing platform as a computing device 100.

In a step S22 the received input image 1 is encoded by the encoder head 22 into a latent (or: hidden) representation with latent features.

In a step S24, the ID mask decoder head 24 generates an ID mask 34 identifying objects 11, 12, 13 and background 14. In other words, ID mask decoder head 24 is configured and trained to generate, from the received input image 1, the ID mask 34.

The ID mask decoder head 24 is configured and trained to generate the ID mask 34 for all objects 11, 12, 13 known to the trained encoder-decoder convolutional artificial neural network 20 at the same time in the same data structure, by providing for each pixel in the input image and for each known object a probability for that pixel to belong to that object. The known objects thus are represented by pre-defined classes, and the ID mask 34 includes a feature for each class (object classes plus the background class).

The ID mask 34 may, for example, be represented by an $H \times W \times N_{o+1}$ dimensional tensor, wherein $N_{o+1}$ is the number of (known and trained) identifiable objects 11, 12, 13 plus 1 for the background 14, such that for each pixel a feature is available that designates with which probability that pixel belongs to each of the identifiable objects 11, 12, 13 or to the background 14.

In an optional step S35, it may be determined (e.g., by an object identifier module 35 implemented by the computing device 100) for each pixel to which object 11, 12, 13 or background 14 it belongs, for example by determining for each pixel the feature of the ID mask 34 with the highest probability value. The result of this determination may be stored in a finalized ID mask.

For example, when only the three objects 11, 12, 13 described above are known and trained ($N_{o+1}=4$), then a specific pixel at height position 100 and at width position 120 may e.g., have 0.15 probability of belonging to a first object (teddy bear 11), 0.35 probability of belonging to a second object (carton of eggs 12), 0.4 probability of belonging to a third object (camera 13), and 0.1 probability of belonging to the background 14. The feature vector at the entry of H=100 and W=120 may then e.g., read [0.15, 0.35, 0.4, 0.1].

In a step S26, the first correspondence color channel decoder head 26 generates a first correspondence color channel 36 of a 2D-to-3D-correspondence map 31 for objects 11, 12, 13 within the received input image 1. In other words, the first correspondence color channel decoder head 26 is configured and trained (and implemented) to generate from the received input image 1 as its input the first correspondence color channel 36 of the 2D-to-3D-correspondence map 31 for objects 11, 12, 13 within the received input image 1. In the present example, the first correspondence color channel 36 is a blue color channel of an RGB color scheme.

In a step S28, the second correspondence color channel decoder head 28 generates a second correspondence color channel 38 of the 2D-to-3D-correspondence map 31 for objects 11, 12, 13 within the received input image 1. In other words, the second correspondence color channel decoder head 28 is configured and trained (and implemented) to generate from the received input image 1 as its input the second correspondence color channel 38 of the 2D-to-3D-correspondence map 31 for objects 11, 12, 13 within the received input image 1. In the present example, the second correspondence color channel 38 is a green color channel of an RGB color scheme. Other color channels may be used for the first and the second correspondence color channel 38, or that even three-color channels may be used, gaining additional reliability and redundancy at the expense of computational resources.

The first and the second correspondence color channels 36, 38 (that may be designated as U and V, respectively) are provided each with a number $N_U$, $N_V$ of features (or: classes), each indicating the probability for that pixel of belonging to a certain color value in the respective correspondence color channel 36, 38 of the 2D-to-3D-correspondence map. The 2D-to-3D-correspondence map may then be represented by a $H \times W \times N_U \times N_V$-dimensional tensor. Each pixel of the input image (identified by its H and W values) is provided with $N_U \times N_V$ features, each indicating with which probability that pixel belongs to a specific color combination (combination of levels of intensity of the two colors).

For example, the 2D-to-3D-correspondence map 31 may be designed such that it distinguishes between 256 different values (levels of intensity of blue color) for the first correspondence color channel and between 256 different values (levels of intensity of green color) for the second correspondence color channel 38. The 2D-to-3D-correspondence map thus will include 256×256=65536 uniquely determined pixels, each including its own combination shade of blue and/or green color.

The ID mask decoder head 24 and the first and second correspondence color channel decoder heads 26, 28 up sample the latent features generated by the encoder head 22 up to its original size using a stack of bilinear interpolations followed by convolutional layers. The proposed method is agnostic to a particular choice of encoder-decoder architecture such that any known encoder-decoder architecture may be used for the encoder-decoder convolutional artificial neural network 20.

In a step S32, the 2D-to-3D-correspondence map 31 is generated map using the generated first correspondence color channel 36 and the generated second correspondence color channel 38, for example in that each pixel is assigned a color shade combination given by the feature (or: class representing a level of intensity of color) with the highest probability from the first correspondence color channel 36 as well as by the feature (or: class representing a level of intensity) with the highest probability from the second correspondence color channel 38.

For example, the above-mentioned pixel at H=100 and W=120 may have the highest probability (e.g., of 0.12 or 12%) of having level of intensity 245 out of 255 in the first correspondence color channel 36, and the highest probability (e.g., of 0.16 or 16% of having level of intensity 136 out of 255 in the second correspondence color channel 38. It may then be finally decided that that pixel at H=100 and W=120 has the value combination 245 (first correspondence color channel 36)/136 (second correspondence color channel 38). The 2D-to-3D-correspondence map 31 will then mark that pixel with the color shade combination 245/136.

Alternatively, already in steps S26 and S28, respectively, a respective single correspondence color channel image may be generated in which each pixel stores the class (i.e., level of intensity of color) in the respective color for which the highest probability has been determined. In the above example, the first color (Blue) single correspondence color channel image would have the pixel at H=100 and W120 have value 245, and the second color (Green) single correspondence color channel image would have the same pixel have value 136.

Step S32 may be performed by a combining module 32 implemented by the computing device 100 of the system 1000.

In a step S40, a pose estimation 51, 52, 53 for at least one object 11, 12, 13, for example for all objects 11, 12, 13 within the input image 1, is generated based on the generated 2D-to-3D-correspondence map 31 and on a corresponding pre-generated bijective association of points of the at least one object with unique value combinations in the first and the second correspondence color channels 36, 38. For example, for each object 11, 12, 13 identified by the ID mask 34, a corresponding pose estimation 51, 52, 53 is generated (or: determined, or provided).

The points of the at least one object may be points on the surface of the object or vertices of a wire model of the object or of a wire model approximating the object 11, 12, 13.

Step S40 may be performed by a pose determining module 40 implemented by the computing device 100 of the system 1000. In other words, the pose determining module 40 is configured to generate a pose estimation for at least one object, for example for all objects within the input image 1, based on the generated 2D-to-3D-correspondence map 31 and on a corresponding pre-generated bijective association of points of the at least one object with unique value combinations in the first and the second correspondence color channels 36, 38.

Step S40 may utilize an algorithm 42 such as the known Perspective-n-Point, PnP, algorithm, optionally combined with a Random Sample Consensus, RANSAC, algorithm. The PnP algorithm estimates the pose (i.e., relative orientation of each object relative to a viewpoint from which the input image 1 was taken, e.g., the location of a camera) given correspondences and intrinsic parameters of the camera. The PnP algorithm refined with the RANSAC algorithm is more robust against possible outliers given many correspondences. The PnP algorithm may be provided as described e.g., in "Z. Zhang. A flexible new technique for camera calibration. IEEE Transactions on Pattern Analysis and Machine Intelligence 22(11):1330-1334. December 2000".

Alternatively, or additionally, a trained artificial intelligence entity 44 such as a trained artificial neural network may be employed to generate the pose determination from the 2D-to-3D-correspondence map 31 as well as from the information about the objects 11, 12, 13 and the background 14 contained in the ID mask 34 or in a finalized ID mask as described in the foregoing.

The result of step S40, or, respectively, of the pose determining module 40, is then output, e.g., by the output interface 50 of the system 1000. The output interface 50 may include a local interface connected to e.g., a bus system of a factory or a hospital and/or an interface for remote connections such as an interface for connecting to a wireless LAN or WAN connection, for example to a cloud computing system and/or the Internet. The determined pose estimation 51, 52, 53 may be output, for example, by twelve values: nine rotation values $R_{ij}$ forming a rotation matrix for describing the orientation of each object 11, 12, 13, and three location values $T_x$, $T_y$, $T_z$ forming a vector describing the center of mass, or space point, of each object 11, 12, 13.

The bijective association of points of the objects 11, 12 13 with unique value combination in the first and second correspondence color channels 36, 38 may be generated by the steps as described in the following with respect to FIG. 2. It should be understood that the steps may be performed as part of the method, for example for each object 11, 12, 13 that shall be known by the trained encoder-decoder convolutional artificial neural network 20, or, in other words, for which the encoder-decoder convolutional artificial neural network 20 is trained.

However, the steps as described with respect to FIG. 2 may also be steps of a method for providing training data for training an encoder-decoder convolutional artificial neural network.

In a step S110, for each of a plurality of objects 11, 12, 13, a respective RGB image 2D patch corresponding to each of a plurality of poses of that object is provided, for example generated.

In a step S120, for each of the plurality of objects and for each of the plurality of poses, a corresponding ground truth ID mask patch is provided, for example generated.

For example, a 3D representation (or: model, for example a CAD model) of at least one object 11, 12, 13, or for all objects 11, 12, 13, may be provided and rendered as an RGB image before a black background from different viewpoints, each viewpoint corresponding to one pose of the object 11, 12, 13 with respect to the viewpoint. For generating the respective RGB image 2D patch, the rendered RGB image may be cropped to include as few pixels beside one single object 11, 12, 13 as possible, and the background may be cut off. The result is the RGB image 2D patch that exactly covers the corresponding object 11, 12, 13 in the corresponding pose (i.e., from the corresponding viewpoint).

According to one variant, for given 3D representations of the objects 11, 12, 13 of interest, a first sub-step is to render them in different poses. The poses are defined e.g., by the vertices of an icosahedron ("sampling vertices") placed around the 3D representation of each object, respectively. To achieve finer sampling, triangles of each icosahedron may be are recursively subdivided into four smaller ones until the desired density of sampling vertices, each corresponding to a pose, of the 3D representation is obtained. For example, 4 subdivisions are used.

Additionally, the virtual view camera may be rotated at each sampling vertex around its viewing direction between two limits with a fixed stride, for example from −30 to 30 degrees, with a stride of 5 degrees, to model in-plane rotations resulting in yet additional poses.

Then, for each of the poses, each object is rendered on a black background and both RGB and depth channels are stored. Using the depth channels, a depth map may be generated for each pose. Having the renderings at hand, the generated depth map may be used as a mask to define a tight bounding box for each generated rendering, i.e., a bounding box including as few pixels as possible besides the object 11, 12, 13 of interest in the rendering.

The image may then be cropped with this bounding box. The RGB patches cut out from the backgrounds and stored as the RGB image 2D patches. Masks separating the patches from the background are stored as ground truth ID mask patches, and the corresponding poses (i.e., virtual camera positions or relative orientation of the object with respect to the virtual camera) are stored as ground truth poses.

Of course, pairs of RGB image 2D patches and corresponding ground truth ID mask patches may also be provided by detecting and annotating real world objects in real world images.

In a step S130, for each of the plurality of objects 11, 12, 13 and for each of the plurality of poses, a corresponding ground truth 2D-to-3D-correspondence map patch is provided, for example generated.

For example, step S130 may include providing, or generating, a correspondence model for each object 11, 12, 13. The correspondence model is generated by texturing the 3D representation of the object 11, 12, 13 using a 2D correspondence texture including of a plurality of pixels, each pixel including a unique value combination in the first and the second correspondence color channels 36, 38. Texturing the 3D representation may be performed using a spherical projection of a 2D correspondence texture onto the 3D representation of the object 11, 12, 13. The 2D correspondence texture may e.g., be a 2D image with color intensity levels ranging from e.g., 1 to 255 for both Blue (first dimension) and Green (second dimension).

In the same way as described above for steps S110 and S120, using the same poses and the same black background, then ground truth 2D-to-3D-correspondence map patches may be generated, i.e., patches covering the objects in the respective pose but showing not real RGB color values but the color combination shades of the 2D correspondence texture that indicate the spatial arrangement of the pixels with respect to each other.

After performing steps S110, S120 and S130, ground truths for both the ID mask and the 2D-to-3D-correspondence map for single objects 11, 12, 13 in single poses are prepared, together with the corresponding RGB image 2D patch.

In a step S140, at least one background, for example a plurality of background images, is provided, for example images from the Microsoft (Trademark) Common Objects in Context, MSCOCO, dataset. Varying the background images between a larger number of background images has the advantage that during training the encoder-decoder architecture does not overfit to the backgrounds. In other words, this provides that the encoder-decoder architecture generalizes to different backgrounds and prevents it from overfitting to backgrounds seen during training. Moreover, it forces the encoder-decoder architecture to learn model's features needed for pose estimation rather than to learn contextual features that might not be present in images when the scene changes.

Then, in a step S150, at least one of the provided RGB image 2D patches (including ideally all of the objects in all of the poses) is arranged onto at least one of the plurality of background images in order to generate a sample input image. Optionally, this sample input image is also augmented, e.g., by random changes in brightness, saturation, and/or contrast values, and/or by adding a Gaussian noise.

Correspondingly, in a step S160, the corresponding ground truth 2D-to-3D-correspondence map patches are arranged (in the same positions and orientations as the RGB image 2D pages onto the chosen background image) onto a black background (with the same dimensions as the chosen background image) to provide a ground truth for the 2D-to-3D-correspondence map for the generated sample input image.

Correspondingly, in a step S170, the corresponding ground truth ID mask patches onto the black background are arranged (in the same positions and orientations as the RGB image 2D pages onto the chosen background image) to provide a ground truth for the ID mask for the generated sample input image.

All of the step S110 to S170, or at least for example steps S150 to S170 may be performed in an online fashion, i.e., performed dynamically whenever another training set is required when training an encoder-decoder architecture.

A system for providing training data may be provided, with an input interface for receiving the plurality of background images (and, optionally, for receiving additional data such as the 3D representations of the objects, or data based on which such 3D representations of the objects may be generated), a computing device configured to perform steps S110 to S170, and an output interface for outputting the sample input images together with its ground truth ID mask and its ground truth 2D-to-3D-correspondence map as a training data set.

For example, the computing device may be realized as an online data generator running on multiple CPU threads constantly putting prepared batches in a queue, from which they are picked as inputs to an encoder-decoder architecture being trained.

Embodiments also provide a computer program including executable program code configured to, when executed (e.g., by a computing device), perform the method, for example as described with respect to FIG. 2.

Embodiments also provide a non-transitory computer-readable data storage medium including executable program code configured to, when executed (e.g., by a computing device), perform the method, for example as described with respect to FIG. 2.

Embodiments also provide a data stream including (or configured to generate) executable program code configured to, when executed (e.g., by a computing device), perform the method, for example as described with respect to FIG. 2.

FIG. 3 schematically illustrates a method according to an embodiment for training an encoder-decoder architecture for use in an embodiment of the method and/or for use in an embodiment of the system.

In a step S210, a plurality of tuples of corresponding sample input images, ground truth ID masks and ground truth 2D-to-3D-correspondence maps is provided. This may include performing the method, for example the method as described with respect to FIG. 2.

Step S210 is performed in an online fashion, i.e., tuples are generated continuously, possible on multiple parallel CPU threads.

The tuples, for example when they are generated based on real world data so that they are much more limited in number, may be divided into a train subset and a test subset that do not overlap. For example, between 10% and 20% of the tuples (for example 15%) may be used for the train subset and the remainder for the test subset.

For example, the tuples for the same object are selected such that the relative orientations of the poses between them is larger than a predefined threshold. This guarantees, for a corresponding minimum number of poses, that the tuples selected cover each object from all sides.

In a step S220, an encoder-decoder convolutional artificial neural network 20 configured to receive the sample input images as input and to output both an ID mask and a 2D-to-3D-correspondence map as output is trained, the training being performed using a loss function penalizing deviations of the output from the ground truth ID mask and the ground truth 2D-to-3D-correspondence map.

For example, a composite loss function Lcomp given by a sum of individual loss functions for mask loss Lm, first correspondence color channel loss LU and second correspondence color channel loss LV may be used:

$$L\text{comp}=a\times Lm+b\times LU+c\times LV,$$

wherein × denotes multiplication and a, b, and c may be weight factors that may also be set to 1. Mask loss Lm indicates and penalizes loss caused by deviation of the result of the encoder-decoder architecture for the ID mask from the ground truth ID mask. First/second correspondence color channel loss LU, LV indicates and penalizes loss caused by deviation of the result of the encoder-decoder architecture for the 2D-to-3D-correspondence map from the ground truth 2D-to-3D-correspondence map.

LU and LV may be defined as multi-class cross-entropy functions. Lm may be a weighted version of a multi-class cross-entropy function, given e.g., by:

$$Lm(y,c)=w_c(-y_c+\log(\text{Sum}(j,N_{O+1},e^{\hat{}}(y_j)))),$$

wherein $y_c$ is an output score of the class c, w sets the resealing weight for each class (1st object/2nd object/ . . . /background), wherein Sum(j,C,F(j)) is the sum over e to the power of $y_j$ for j running from 1 to $N_{O+1}$, wherein $N_{O+1}$ is the total number of classes (i.e. number of object classes, or different objects, plus 1 for the background class). The resealing weights are for example set to 0.01 for the background class and 1 for each object class.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

Figure 4:
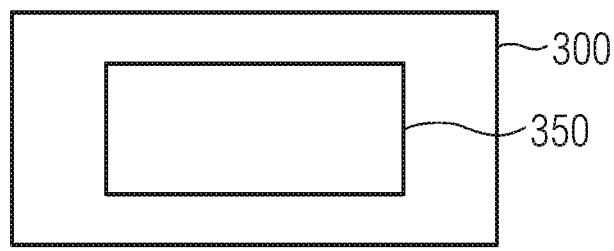
FIG. 4 schematically illustrates a computer program product according to an embodiment.

FIG. 4 schematically a computer program product 300 including executable program code 350. The executable program code 350 may be configured to perform, when executed (e.g., by a computing device), the method. Alternatively, the executable program code 350 may be configured to perform, when executed (e.g., by a computing device), other methods described herein.

Figure 5:
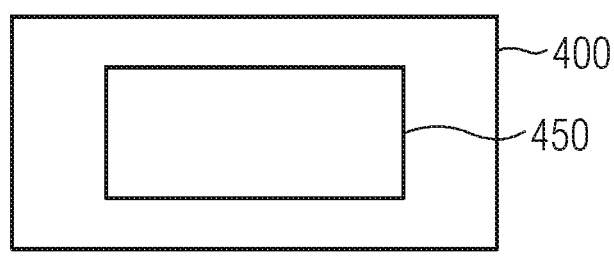
FIG. 5 schematically illustrates a data storage medium according to an embodiment.

FIG. 5 schematically illustrates a non-transitory computer-readable data storage medium 400 including executable program code 450 configured to, when executed (e.g., by a computing de-vice), perform the method. Alternatively, the executable program code 450 may be configured to perform, when executed (e.g., by a computing device), others methods described herein.

It is to be understood that the elements and features recited in the appended claims may be combined in different ways to produce new claims that likewise fall within the scope of the present embodiments. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present embodiments have been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A computer-implemented method for object detection and pose estimation within an input image, the method comprising:
    receiving the input image;
    inputting the received input image into a trained encoder-decoder convolutional artificial neural network comprising an encoder head, an ID mask decoder head, a first correspondence color channel decoder head, and a second correspondence color channel decoder head;
    generating, using the ID mask decoder head, an ID mask identifying one or more objects and background in the received input image;
    generating, using the first correspondence color channel decoder head, a first correspondence color channel of a 2D-to-3D-correspondence map for the one or more objects within the received input image;
    generating, using the second correspondence color channel decoder head, a second correspondence color channel of the 2D-to-3D-correspondence map;
    generating the 2D-to-3D-correspondence map using the generated first correspondence color channel and the generated second correspondence color channel; and
    determining, for at least one object of the one or more objects identified by the ID mask, a pose estimation based on the generated 2D-to-3D-correspondence map and on a pre-generated bijective association of points of the object with unique value combinations in the first correspondence color channel and the second correspondence color channel.

2. The method of claim 1, wherein the first correspondence color channel is a Blue color channel, wherein the second correspondence color channel is a Green color channel, or wherein the first correspondence color channel is the Blue color channel and the second correspondence color channel is the Green color channel.

3. The method of claim 1, wherein determining of the pose estimation uses a Perspective-n-Point (PnP) algorithm.

4. The method of claim 3, wherein the PnP algorithm is used with a Random Sample Consensus (RANSAC) algorithm.

5. The method of claim 1, wherein determining of the pose estimation uses a trained artificial neural network entity configured and trained to generate, from the ID mask and the 2D-to-3D-correspondence map, probabilities for each of a plurality of 3D poses of the at least one object.

6. The method of claim 1, further comprising:
generating the pre-generated bijective association for at least one object, the pre-generated bijective association generated by texturing a 3D representation of an object using a 2D correspondence texture consisting of a plurality of pixels, each pixel including a unique value combination in the first and the second correspondence color channels.

7. The method of claim 6, wherein texturing the 3D representation of the at least one object is performed using a spherical projection.

8. A System for object detection and pose estimation within an input image, the system comprising:
an input interface for receiving the input image;
a computing device configured to implement a trained encoder-decoder convolutional artificial neural network comprising an encoder head, an ID mask decoder head, a first correspondence color channel decoder head and a second correspondence color channel decoder head;
wherein the ID mask decoder head is configured and trained to generate an ID mask identifying one or more objects and background in the received input image;
wherein the first correspondence color channel decoder head is configured and trained to generate a first correspondence color channel of a 2D-to-3D-correspondence map for the one or more objects within the received input image;
wherein the second correspondence color channel decoder head is configured and trained to generate a second correspondence color channel of the 2D-to-3D-correspondence map;
wherein the computing device is further configured to implement a combining module and a pose determining module;
wherein the combining module is configured to generate the 2D-to-3D-correspondence map using the generated first correspondence color channel and the generated second correspondence color channel; and
wherein the pose determining module is configured to determine, for an object of the one or more objects identified by the ID mask, a pose estimation based on the generated 2D-to-3D-correspondence map and on a pre-generated bijective association of points of the object with unique value combinations in the first correspondence color channel and the second correspondence color channel.

9. The system of claim 8, wherein the first correspondence color channel is a Blue color channel, wherein the second correspondence color channel is a Green color channel, or wherein the first correspondence color channel is the Blue color channel and the second correspondence color channel is the Green color channel.

10. The system of claim 8, wherein the pose determining module is configured to determine of the pose estimation using a Perspective-n-Point (PnP) algorithm.

11. The system of claim 10, wherein the PnP algorithm is used with a Random Sample Consensus (RANSAC) algorithm.

12. The system of claim 8, wherein the pose determining module is configured to determine the pose estimation using a trained artificial neural network entity configured and trained to generate, from the ID mask and the 2D-to-3D-correspondence map, probabilities for each of a plurality of 3D poses of the object.

13. The system of claim 8, wherein the computing device is further configured to generate the pre-generated bijective association for at least one object of the one or more objects, the pre-generated bijective association generated by texturing a 3D representation of an object using a 2D correspondence texture consisting of a plurality of pixels, each pixel including a unique value combination in the first and the second correspondence color channels.

14. The system of claim 13, wherein texturing the 3D representation of the at least one object is performed using a spherical projection.

* * * * *